Dec. 25, 1951 D. M. LIEBHART ET AL 2,579,938
TEMPERATURE CONTROL VALVE
Filed April 26, 1947
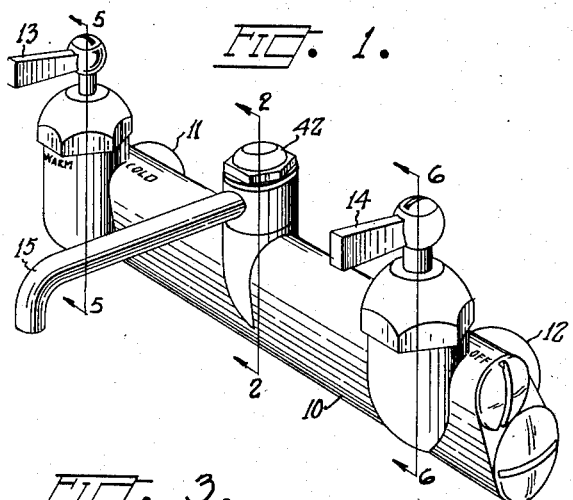
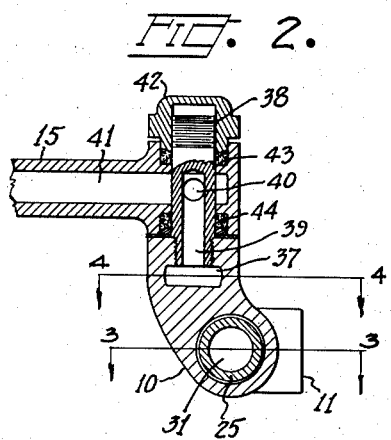
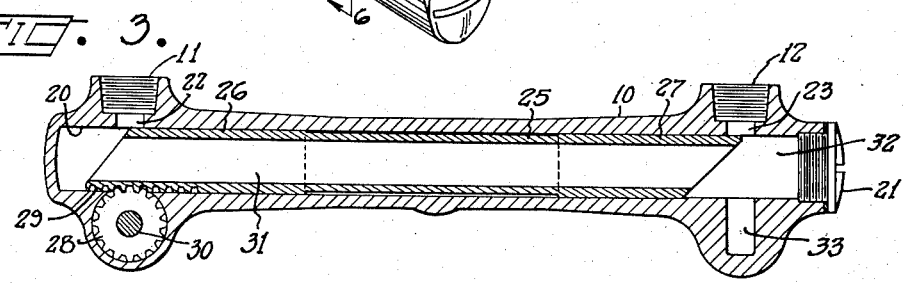
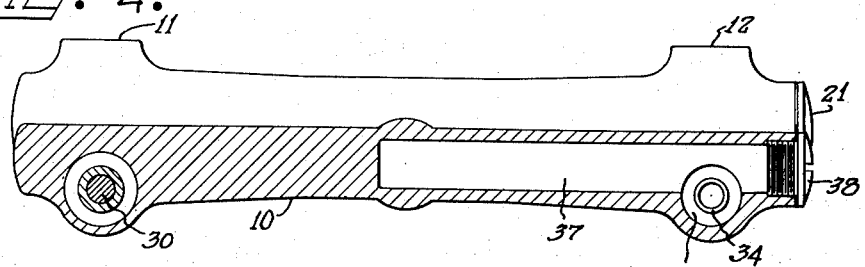
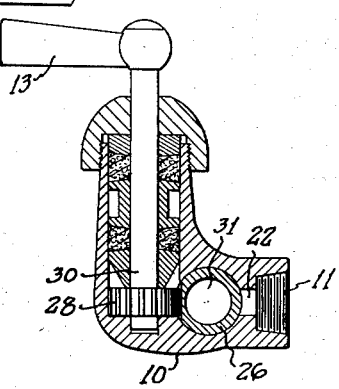
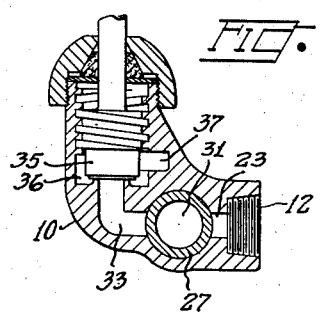
INVENTORS
DORSEY M. LIEBHART
PAUL S. DUNAWAY
BY
Cook and Schermerhorn
ATTORNEYS Patented Dec. 25, 1951

2,579,938

UNITED STATES PATENT OFFICE 2,579,938

TEMPERATURE CONTROL VALVE

Dorsey M. Liebhart and Paul S. Dunaway, Portland, Oreg.

Application April 26, 1947, Serial No. 744,132

9 Claims. (Cl. 277—50)

This invention relates to valve controls for double faucets used in wash basins, tubs, showers and the like for mixing hot and cold water in varying proportion.

The general object of the invention is to provide an improved valve control of the type described to regulate both the volume of water delivered and the proportion of hot and cold water.

Another object is to provide an improved unitary plumbing fixture for controlling the proportion of hot and cold water and the volume of the mixture delivered, each independently of the other, so that the mixture control may be left in any desired position when the water is turned off. Another object is to provide an attractive plumbing fixture for the purpose described which is effective and durable and economical to manufacture. Another object is to provide an improved mixing valve for hot and cold water to control the temperature of the water delivered.

These and other objects of the invention will be apparent from the following description in connection with the accompanying drawings showing two embodiments of the invention.

In the drawings:

Figure 1 is a perspective view of a preferred embodiment of the invention;

Figure 2 is a cross sectional view taken on the line 2—2 of Figure 1;

Figure 3 is a longitudinal sectional view taken on the line 3—3 of Figure 2;

Figure 4 is a longitudinal section view taken on the line 4—4 of Figure 2;

Figure 5 is a cross sectional view taken on the line 5—5 of Figure 1; and

Figure 6 is a cross sectional view taken on the line 6—6 of Figure 1.

The embodiment shown in Figure 1 comprises an elongated body 10 having a hot water inlet 11 and a cold water inlet 12, these inlets being disposed at the opposite ends of the body as shown. The numeral 13 designates an operating handle at one end of the body for a mixing valve to control the proportion of hot and cold water to regulate the temperature of the mixture delivered from the discharge spout 15. The internal construction of the body is such that when the valve handle 13 is moved to the extreme left the cold water is shut off at the inlet 12 and the hot water is admitted in a full stream through the inlet 11. When this valve handle is moved to its extreme right position, the hot water is shut off and the cold water is allowed to flow in a full stream. In intermediate positions of the valve handle, both hot and cold water are admitted into the body 10 in varying proportion, determined by the position of the handle, but at no time can both the hot and cold water be shut off simultaneously by the handle 13. The volume of the mixture thus regulated by the mixing valve to give the proper temperature is controlled by a valve handle 14 at the other end of the body to produce a slow or fast flow or to shut off the flow entirely. Thus, when the flow is shut off by the valve handle 14, the mixing valve handle 13 may be left in a selected position to provide hot water again from time to time at the same temperature. If the temperatures of the hot and cold water are fairly constant, it is of considerable advantage to be able to leave the mixing valve handle 13 in a set position which has been found by experience to provide water of the desired temperature.

In most conventional mixing valves for wash basins and showers, the water is shut off by the mixing valve itself, so that it cannot be left in a set position to provide water of the proper temperature without careful adjustment each time the water is turned on. With most conventional mixing valves it is, therefore, necessary first to turn the water on and let it run until the hot water from the tank has reached the faucet and then test the water and manipulate the valve to adjust the temperature while it is flowing. Some mixing valves have heretofore been made with a crude scale and pointer arrangement with the intention of making it possible to duplicate previous settings of the valve, but these arrangements are generally not satisfactory in operation because of looseness or lost motion in the parts and the great change in temperature of the water usually produced by a very small movement of the valve handle. In the present construction, the mixing valve may be left indefinitely in a set position to produce the desired temperature of water for washing the hands or taking a shower, and as long as the temperatures of the hot and cold water supplies remain constant the user need not be further concerned with the mixing valve when he wishes to draw hot water from time to time. This feature of operation is inherent in the device herein disclosed, and the details of construction thereof will now be described with reference to the various sectional views in the drawings.

Referring now to Figures 2 to 6, the body 10 contains a longitudinal cylindrical bore 20 which is closed and sealed at one end of the body by the plug 21. The hot water inlet 11 communicates with one end of this bore through a port 22, and the cold water inlet 12 communicates with the other end of the bore through a port 23. Slidably mounted within the bore is a hollow piston type mixing valve 25. On one end of this valve member is formed a piston 26 having a substantially watertight sliding fit within the bore and adapted upon longitudinal movement to cover or uncover the hot water inlet port 22. A similar piston 27 is formed on the other end of the valve member to cover or uncover the cold water inlet port 23, the length of the member being such that when it is in an intermediate position, as shown in Figure 3, both the hot and cold water ports are half uncovered. When the valve member 25 is moved to the right, the cold water inlet port 23 is thereby entirely covered and the hot water inlet port 22 is entirely uncovered, and when the valve member is moved to the left, the hot water inlet port is covered and the cold water inlet port is uncovered. The valve member is moved longitudinally in the bore in this manner to produce a mixture of the desired temperature by means of a pinion gear 28 in driving engagement with rack teeth 29 on the valve member. The gear 28 is mounted on a vertical shaft 30 which carries the mixture control handle 13. The valve member 25 is hollow, having a longitudinal passage 31 therethrough whereby the hot and cold water admitted by the valve can mix together in a space 32 at one end of the bore 20 behind the plug 21. The valve is thereby balanced so that it is not affected by the water pressure.

A short angular passage 33 communicates with the space 32 and extends upwardly within the body 10, terminating in a circular valve seat 34 for a volume control and shut off valve 35 in a valve chamber 36, as shown in Figure 6. The valve 35 is mounted on a vertical stem carrying the volume control handle 14. Communicating with the valve chamber 36 is a second longitudinal passage 37 closed at one end by a plug 38 and extending to the mid portion of the body 10. A hollow post 38 is mounted vertically in a mid portion of the body 10 so that the lower end of an internal passage 39 in the post is placed in communication with the passage 37, as shown in Figure 2. This post forms a vertical trunnion for pivotally mounting the swing spout 15, communication being established through holes 40 to the passage 41 in the spout. The spout is held on the vertical trunnion post 38 by a nut 42 which may be tightened to compress the packing rings 43 and 44 to prevent leakage in the joint.

Thus, the valve 35, operated by the handle 14, controls the volume of the mixture delivered through the spout 15 at a temperature as determined by the position of the mixing valve 25 movable by the handle 13. The mixing valve may be left in a set position to always deliver water at the same temperature whenever the volume valve is opened. This particular style of fixture is intended for use with wash basins and laundry tubs. It may also be used for bathtubs by substituting a short fixed spout for the swing spout 15, or for shower baths by installing a pipe connection to the shower head in place of the swing spout.

In connecting this plumbing fixture with the hot and cold water systems in a building it is desirable to install a check valve in the cold water pipe leading to the cold water inlet 12 to prevent hot water from circulating back into the cold water system when a cold water faucet elsewhere in the system is opened.

Various changes may be made in the construction and arrangement of parts, and all such modifications with the scope of the appended claims are included in the invention.

Having now described our invention and in what manner the same may be used, what we claim as new and desire to protect by Letters Patent is:

1. A plumbing fixture comprising an elongated body having a hot water inlet at one end, and a cold water inlet at the opposite end thereof, a mixing valve member extending longitudinally through said body to control the relative flows through said inlets, a manual operator for said mixing valve at one end of said body, a volume control valve to control the volume of said mixture, and a manual operator for said volume control valve at the other end of said body.

2. A plumbing fixture comprising an elongated body having a hot water inlet at one end, and a cold water inlet at the opposite end thereof, a mixing valve member extending longitudinally through said body to control the relative flows through said inlets, a manual operator for said mixing valve at one end of said body, a volume control valve to control the volume of said mixture, a manual operator for said volume control valve at the other end of said body, and an outlet for said mixture in the mid portion of said body.

3. A plumbing fixture comprising an elongated body having a hot water inlet at one end, and a cold water inlet at the opposite end thereof, a mixing valve member extending longitudinally through said body to control the relative flows through said inlets, one end of said valve member controlling the admission of one of said inlets and the other end of said valve member controlling the admission of the other inlet, a manual operator for said mixing valve at one end of said body, a volume control valve at the other end of said body, passages in said body from said inlets to said volume control valve, and an outlet for the mixture in the mid portion of said body.

4. A plumbing fixture comprising an elongated body having a hot water inlet at one end, and a cold water inlet at the opposite end thereof, a volume control valve at one end of said body, passages from said inlets to said valve, a mixing valve controlling the relative flows through said inlets, and a manual operator for said mixing valve at the other end of said body.

5. A plumbing fixture comprising an elongated body having a hot water inlet at one end, and a cold water inlet at the opposite end thereof, a mixing valve member extending longitudinally through said body and having end portions controlling the admission of the respective inlets, a volume control valve for controlling the volume of the mixture and for shutting off the mixture flow, and passages controlled by said mixing valve leading from said inlets to said volume control valve.

6. A plumbing fixture comprising an elongated body having a hot water inlet at one end, and a cold water inlet at the opposite end thereof, a volume control valve at one end of said body, a passage from one of said inlets to said valve, a mixing valve extending longitudinally through said body and having end portions controlling the admission of the respective inlets, and a passage through said mixing valve from the other of said inlets to said volume control valve.

7. A plumbing fixture comprising an elongated body having a hot water inlet at one end, and a cold water inlet at the opposite end thereof, a volume control valve at one end of said body, a passage from one of said inlets to said valve, a balanced mixing valve extending longitudinally through said body and having end portions controlling the admission of the respective inlets, a passage through said mixing valve from the other of said inlets to said volume control valve, and a manual operator for said mixing valve at the other end of said body.

8. A mixing valve plumbing fixture comprising a body member having a bore therein, hot and cold water inlets communicating with said bore at longitudinally spaced points, a mixing valve member fitting said bore and mounted for longitudinal sliding movement therein, said valve member having a limit position toward one end of said bore covering said hot water inlet and uncovering said cold water inlet and having a limit position toward the opposite end of said bore covering said cold water inlet and uncovering said hot water inlet, said valve member having end portions uncovering both of said inlets in varying degrees in all other positions, an outlet for the fixture communicating with said bore, and a volume control valve between said bore and outlet to control the flow through said outlet and to shut off said flow in all adjustments of said mixing valve.

9. A mixing valve plumbing fixture comprising a body member having a cylindrical bore therein, hot and cold water inlets communicating with said bore at longitudinally spaced points, a mixing valve comprising a hollow sleeve mounted for longitudinal sliding movement in said bore to cover and uncover said inlets in varying degrees, an outlet for the fixture communicating with said bore, and a volume control valve between said bore and outlet to control the flow through said outlet and to shut off said flow in all adjustments of said mixing valve.

DORSEY M. LIEBHART.
PAUL S. DUNAWAY.

REFERENCES CITED

The following references are of record in the file of this patent:

UNITED STATES PATENTS

| Number | Name | Date |
|---|---|---|
| 1,730,534 | Rosenbaum | Oct. 8, 1929 |
| 2,017,864 | Lundegard | Oct. 22, 1935 |
| 2,158,342 | Trader | May 19, 1939 |